(12) United States Patent
Schroader

(10) Patent No.: US 11,142,407 B2
(45) Date of Patent: Oct. 12, 2021

(54) CONVEYOR WITH JAM PREVENTION DIVERTER WHEELS

(71) Applicant: FIVES INTRALOGISTICS CORP., Louisville, KY (US)

(72) Inventor: Steven Vann Schroader, Louisville, KY (US)

(73) Assignee: Fives Intralogistics Corp, Louisville, KS (US)

( * ) Notice: Subject to any disclaimer, the term of this patent is extended or adjusted under 35 U.S.C. 154(b) by 0 days.

(21) Appl. No.: 16/827,636

(22) Filed: Mar. 23, 2020

(65) Prior Publication Data

US 2020/0354160 A1    Nov. 12, 2020

Related U.S. Application Data

(60) Provisional application No. 62/822,419, filed on Mar. 22, 2019.

(51) Int. Cl.
| | |
|---|---|
| *B65G 47/68* | (2006.01) |
| *B65G 39/12* | (2006.01) |
| *B65G 47/54* | (2006.01) |
| *B65G 13/071* | (2006.01) |

(52) U.S. Cl.
CPC ........... *B65G 47/68* (2013.01); *B65G 13/071* (2013.01); *B65G 39/12* (2013.01); *B65G 2047/685* (2013.01)

(58) Field of Classification Search
None
See application file for complete search history.

(56) References Cited

U.S. PATENT DOCUMENTS

| | | | |
|---|---|---|---|
| 4,696,386 A * | 9/1987 | Lem ...................... | B65G 47/54 198/370.09 |
| 4,718,543 A | 1/1988 | Leisner et al. | |
| 4,901,845 A | 2/1990 | Zorgiebel | |
| 5,145,049 A * | 9/1992 | McClurkin .......... | B65G 47/086 198/374 |
| 5,311,982 A | 5/1994 | Clopton | |

(Continued)

*Primary Examiner* — Kavel Singh
(74) *Attorney, Agent, or Firm* — Carrithers Law Office, PLLC; David W. Carrithers

(57) ABSTRACT

Roller conveyors can only safely convey articles up to a certain width to downstream conveyors without jamming. The present invention utilizes at least one and preferably a plurality of jam prevention diverter wheels disposed at a selected angle between adjacent rollers of a conveyor with a portion of the diverter wheels extending above the surface of the conveyor rollers to contact items and limit the width of items that can pass through without jamming the conveyor. The diverter wheels are rotated with power mechanically derived from the main powered conveyor rollers. A portion of diverter wheels extend above the skewed roller conveyor surface a selected distance and at a selected angle to contact conveyed articles and only allow items up to a certain size to pass diverting wide items or misaligned items having a width wider than desired for passing through to a downstream conveyor. Jam prevention is the point. If an item width exceeds a given threshold width the diverter wheels come into contact with the term and engage the item pulling the item away from the conveyor stream.

16 Claims, 15 Drawing Sheets

(56) References Cited

U.S. PATENT DOCUMENTS

| | | | | |
|---|---|---|---|---|
| 5,836,439 A | * | 11/1998 | Coyette | B65H 5/18 |
| | | | | 198/415 |
| 5,921,374 A | * | 7/1999 | Takino | B65G 13/10 |
| | | | | 198/369.4 |
| 5,971,132 A | * | 10/1999 | Bonnet | B65G 47/54 |
| | | | | 198/370.07 |
| 6,131,723 A | | 10/2000 | Schroader | |
| 6,848,583 B2 | | 2/2005 | Largent | |
| 6,896,122 B2 | | 5/2005 | Gambrell et al. | |
| 7,137,505 B2 | | 11/2006 | Stebnicki et al. | |
| 7,287,640 B1 | | 10/2007 | Schmutzler | |
| 7,537,106 B2 | * | 5/2009 | Fourney | B65G 17/08 |
| | | | | 198/370.03 |
| 7,721,874 B2 | | 5/2010 | Chen | |
| 2010/0230247 A1 | | 9/2010 | McKee | |
| 2014/0183002 A1 | | 7/2014 | Tully | |
| 2014/0183006 A1 | | 7/2014 | Tully | |
| 2015/0291368 A1 | | 10/2015 | Pettinga | |

* cited by examiner

CONVEYOR WITH JAM PREVENTION DIVERTER WHEELS

CROSS REFERENCE TO RELATED APPLICATIONS

This application claims priority from U.S. Provisional Application Ser. No. 62/822,419 filed on Mar. 22, 2019 and is incorporated by reference herein in its entirety.

TECHNICAL FIELD OF THE INVENTION

This invention relates generally to a jam prevention diverter wheel disposed at a selected angle between adjacent rollers of a conveyor and above the surface of the conveyor rollers to limit the width of items that can pass through without jamming the conveyor.

BACKGROUND OF THE INVENTION

The present invention relates to material handling and in particular to methods and apparatuses for conveying packages.

Roller conveyors include a plurality of closed spaced conveyors. They are designed for conveying packages at least six inches long so the conveyor rollers must be typically be spaced within inches of each other to prevent the package from falling in between. Moreover, conveyor rollers are often used to move and direct articles in a forward and/or lateral direction. The conveyor rollers are supported by a spindle and are rotatable on a axis which can be slanted to provide skewed conveyor rollers bias articles in a forward and lateral direction as opposed to belted conveyors which only pull in a single forward or backward direction.

In a powered roller conveyor, articles rest on top of the rollers and are conveyed as the rollers are rotated by a power source. A powered roller conveyor comprises a plurality of these powered rollers aligned parallel to one another. A diverter for such a conveyor is normally located in a gap where one or more of these rollers have been removed. In a segment of the main conveyor, the diverter wheels may be mounted on supports in such a manner that movement of the supports causes the diverter wheels to become oriented diagonally with respect to the flow path of the main conveyor. When this occurs, an article moving along the conveyor will be diverted off toward a side of the main conveyor. If an intersecting conveyor is located appropriately, the article will be diverted thereto.

The diverter wheels are mounted at a permanent vertical position above the conveying surface of the main conveyor. Articles moving along the main conveyor, then, are contacted by the diverter wheels and are diverted. A major problem with this type of diverter is that even when diversion is not desired, the articles bump into, and are contacted by the diverter rollers. This imparts unnecessary and sometimes damaging shock to the articles. The present invention provide deflectors to minimize resistance to packages encountering the diverter wheels.

In powered conveyors, the diverter wheels of the diverter assembly may extend slightly above the conveying surface of the main skewed rollers of the conveyor, so that they lift the article slightly, and remove the component of momentum imparted by the main conveyor, as the article is diverted. The diverter wheels are preferably rotationally powered, for efficiency in diverting the articles from their original course. Larger angles of diversion are preferable, since they cause the article to be diverted more rapidly, and over a shorter turn distance, than do small angles.

Power to drive the diverter wheels is mechanically "frictionally" derived from the conveyor rollers of the main conveyor.

SUMMARY OF THE INVENTION

Roller conveyors can only safely convey articles up to a certain width to downstream conveyors without jamming. The present invention utilizes at least one and preferably a plurality of jam prevention diverter wheels disposed at a selected angle between adjacent rollers of a conveyor with a portion of the diverter wheels extending above the surface of the conveyor rollers to contact items and limit the width of items that can pass through without jamming the conveyor. The diverter wheels are rotated with power mechanically derived from the main powered conveyor rollers. A portion of diverter wheels extend above the surface of the powered skewed roller conveyor surface a selected distance and at a selected angle to contact conveyed articles and only allow items up to a certain size to pass diverting wide items or misaligned items having a width wider than desired for passing through to a downstream conveyor. Jam prevention is the point. If an item width exceeds a given threshold width the diverter wheels come into contact with the term and engage the item pulling the item away from the conveyor stream.

The instant diverter wheel assembly is especially useful for substitution for a conveyor roller as set forth in Applicant's prior U.S. Pat. No. 9,694,987 which issued on Jul. 4, 2017 from U.S. application Ser. No. 14/757,664 filed on Dec. 22, 2015 is incorporated herein by reference in its entirety and describes a conveyor glide plate for use with conveyor rollers.

Conveyor glide plates inserted between powered conveyor rollers provide support between the rollers. The glide plate main body includes forward and rear flexible flaps forming a leading edge and a trailing edge extending from the main body which includes an attachment member for cooperatively engaging a conveyor roller support member such as a clip or bracket used to affix the rollers to the conveyor. The width of the glide plate is selected based on the width of the conveyor or length of the roller. When a downstream conveyor can only safely conveyor articles up to a certain width without jamming, a converter assembly with jam prevention diverter wheels divert packages from a main conveyor to an intersecting conveyor using a plurality of diverter wheels mounted at selected locations in the gap between the conveyor rollers in openings in the glide plates or between conveyor rollers when no glide plates are needed. The diverter wheels are rotated with power mechanically derived from the main conveyor rollers. The diverter wheels extend above the skewed roller conveyor surface to contact packages and lowered when not in use, rather the diverter wheels are installed in a position to extend above the surface of the powered roller conveyor an amount or distance effective to divert a package. The diverter wheels extend above the surface an effective distance to contact and maintain frictional control of the conveyed article. The diverted wheels protrude or extend above the conveyor skewed roller surface by an effective distance or up to an inch above the top surface of the conveyor, and more preferably up to ¾ inches above the conveyor surface and more preferably about a ½ inch above the top surface of the conveyor surface to only allow items up to a certain size to pass. Jam Prevention is the point. If the package, article, or item width exceeds a selected threshold width, the article contacts the diverter wheels which are engaged thus pulling the item away from the main stream of the conveyor.

The present invention provides a diverter assembly which can substituted for a glide plate or disposed in other powered roller conveyors. The conveyor and diverter wheel assembly, comprises a roller conveyor comprising a plurality of powered skewed rollers having a low friction conveying surface moving items in a forward and lateral direction. The roller conveyor includes a vertical sidewall extending along a lateral edge thereof and at least one diverter wheel assembly affixed to a frame supporting the roller conveyor. The diverter wheel is in frictional contact with a selected one of the first conveyor roller and the second conveyor roller rotating the diverter wheel. The diverter wheel assembly disposed at a selected angle between a first conveyor roller and a second conveyor roller of the roller conveyor and has a portion of a diverter wheel of the diverter wheel assembly extending above the conveying surface of the roller conveyor. At least one diverter wheel assembly spaced apart from the vertical sidewall a selected distance. The diverter wheel is affixed at an effective angle and an effective height whereby the portion of the diverter wheel extending above the surface of the roller conveyor contacting articles conveyed by the roller conveyor having a selected width greater than a distance between the diverter wheel and the vertical side wall are turned and oriented to pass therethrough and the articles wider than the distance between the diverter wheel and the vertical wall are diverted from the roller conveyor.

More particularly, the roller conveyor and diverter wheel assembly comprises a roller conveyor including a plurality of powered skewed rollers having a low friction surface conveying articles forward and laterally. The conveyor includes a diverter wheel assembly disposed at a selected location of the skewed roller conveyor between a first roller and a second roller. The diverter wheel assembly prevents an article exceeding a selected width from passing through from a first conveyor to an intersecting second conveyor. The diverter wheel assembly are mounted on an axle and a roller surface for engaging an article moving along the conveying surface which imparts momentum to the article or package. Drive means for rotating the conveyor rollers synchronously are provided by the powered conveyor rollers. A spindle assembly for mounting the diverter wheels thereon includes a tension spring means mounting on the spindle assembly for biasing an outer high friction surface of the diverter wheels against a outer surface of an adjacent conveyor roller for rotating the diverter wheel. Means for mounting the spindle assembly to the longitudinal lateral cross member is provided for supporting the conveyor diverter wheels. The diverter wheels is oriented relative to the conveyor with the diverter wheel axles generally perpendicularly aligned to a path of movement of the articles upon the roller conveyor and with an uppermost portion of each of the roller surfaces positioned above the conveying surface. Optionally, a deflector plate attaching to a top surface of the spindle and surrounding a major portion of the diverter wheels whereby the diverter wheels engage the articles and lift and divert same toward the second conveyor, while simultaneously conveying momentum to the articles.

Depending upon the conveyor load, a cost savings can be realized by substituting inexpensive glide plate support members or specially designed spacers between the conveyors to take the place of one or more rollers depending upon the size of the articles conveyor on the conveyor rollers. The glide plate support members of the instant invention are inexpensive and can be used between rollers or positioned in a series between rollers in order to facilitate movement of parcels, packages, bags, or other articles by a conveyor utilizing rollers to move articles in a forward and/or a lateral direction depending upon the orientation of the conveyor rollers and minimize articles or parts thereof falling in-between the conveyor rollers causing damage to the article conveyed or the conveyor. The glide plates of the present invention are fabricated in a corresponding size in order to be removably inserted as needed for conveyor rollers in a conveyor assembly. The glide plates are light and inexpensive to fabricate as compared to conveyor rollers and have no moving parts. The length corresponds to the length of the conveyor rollers replaced by the glide plates. The width of the glide plates is variable and depends upon the length of the conveyor roller or width of the conveyor. It is contemplated that selected surfaces or portions of the glide plates can include areas coated or covered in materials having different friction capabilities, anti static properties, low friction and high wear capabilities such as TEFLON, high friction properties such as a rubber or polymer coating, variable porosity. It is also contemplated that the length and width of one or more glide plates may be varied to provide directional bias and enhancement to a curved section of the conveyor.

The glide plate assembly of the present invention provides a spacer means for removing selected conveyor rollers and substituting a glide plate support therefor. The glide plate assembly includes lateral cross members extending between the end of the longitudinal conveyor frame members. The lateral cross members include attachment and/or holding means defining support clips which correspondingly engage and are removably attached and detached to conveyor frame roller support brackets. The main body of the glide plate includes a pair of opposing off-center glide plate attachment flanges or prongs extending from the bottom surface thereof having an exterior size and shape corresponding to the cross-sectional shape of the lateral cross member whereby the glide plate opposing attachment flanges include a distal edge projection or outwardly curved lip which cooperatively engage inwardly turned flanges holding the glide plate in position across the lateral cross member. Typically the length of the glide plate and the lateral cross member will be of corresponding length; however, it is anticipated that a plurality of glide plates of a selected length can be used on the same lateral cross member such as to repair a damaged section. The distal end of the lateral cross member holds the support clip disposed therein which is removably attached to the attachment bracket of the conveyor.

The conveyor diverter wheel assembly is provided for diverting articles, such as packages, moving along a main belt conveyor to an intersecting secondary conveyor, operating at a selected angle to the main conveyor. The main conveyor includes a plurality of powered conveyor rollers rotatably mounted on a main support structure. Each diverter wheel assembly includes an adapter mountable to a frame, and a tension spring means to bias the edge or the diverter wheel against the side of a powered conveyor roller. In one embodiment, the diverter wheel can divert articles on to a belt going in an opposite direction of the main skewed roller conveyor to return items to the feed end of a singulator. The diverter wheels can be used to direct the articles to another conveyor, remove articles from the main conveyor, or reroute the articles so that they pass through a singulator or other orienting device in order for the article to pass through a restriction in the conveyor line to restrict the packages in accordance to size or orientation.

A row of diverter wheels can be mounted within the assembly frame spaced apart from one another. The frame is oriented in a gap between two separated conveyor rollers and within an opening formed in the glide plate support frame more specifically a longitudinal lateral cross member.

It is an object of the present invention to provide a glide plate support clip including spaced apart off-center upwardly extending projections or flanges adjacent to the opposing inner side walls of a lateral cross member and cooperatively engaging the inner curved edge of the lateral cross member.

It is an object of the present invention to provide a glide plate wherein the front portion of the spacer may be molded or formed so that the forward distal end of the flap includes a concave curve downward and a forms a flexible lip which is turned upward and having a leading edge spaced apart from the surface of an adjacent roller in order to eliminate scraping noises and facilitate smooth transition of an article moving from the conveyor roller to the conveyor glide plate.

It is an object of the present invention to provide a glide plate wherein the rear portion of the support clip strip defines a rear flap having a trailing edge which extends toward the following conveyor.

It is an object of the present invention to provide a glide plate assembly or diverter wheel assembly which can be substituted for conventional conveyor rollers and attached to conventional conveyor frame roller attachment brackets.

It is an object of the present invention to provide a diverter wheel assembly which takes up a minimal amount of conveyor space so that the size of the gap between supported sections of the conveyor rollers is relatively small, resulting in relatively higher efficiency, safety, and ease of operation.

It is an object of the present invention to provide such an assembly which is characterized by a plurality of diverter wheels which are mounted in the diverter assembly in engagement and mountable to the glide plate frame.

It is an object of the present invention to provide such an assembly in which the articles are supported, within the gap, by the diverter wheels.

It is an object of the present invention to provide such a diverter wheel assembly which is relatively easy to deploy and disassemble.

It is an object of the present invention to provide such a diverter wheel assembly which is relatively inexpensive to produce.

It is an object of the present invention to include a plurality of skewed rollers disposed in a conventional skewed roller conveyor to produce a lateral component for urging or driving items in a selected direction;

It is an object of the present invention to include a plurality of skewed rollers disposed in a conventional skewed roller conveyor to produce a lateral component for urging or driving items against a wall.

It is an object of the present invention and to provide such a diverter wheel assembly which is easy to manufacture, simple to use, and which is particularly well adapted for the proposed usage thereof.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
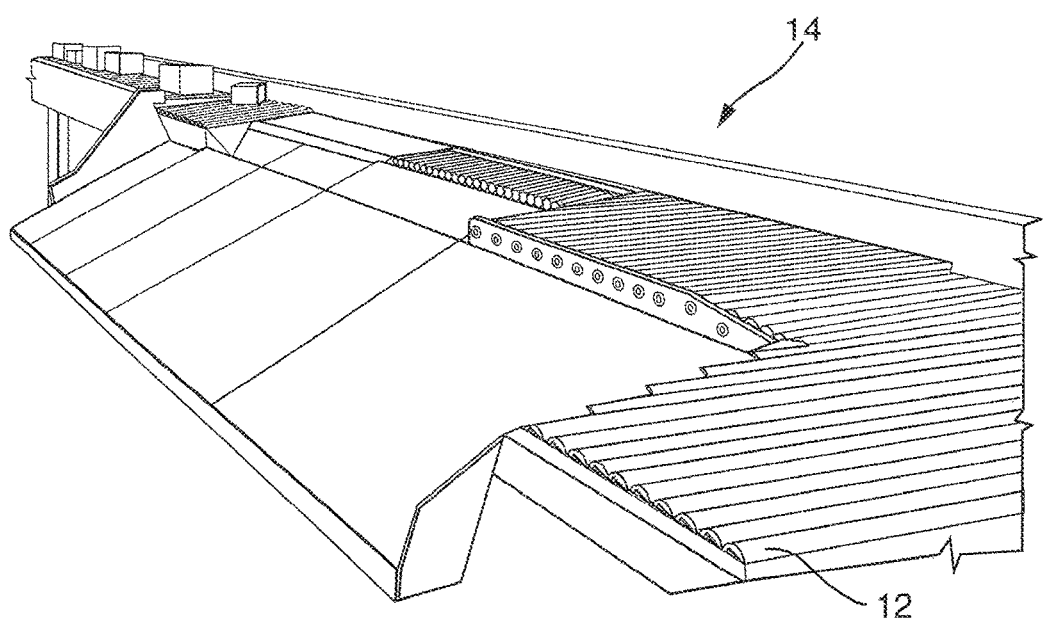
FIG. 1 is an isometric view of a conventional roller conveyor including a plurality of skewed rollers that produce a lateral component for urging or driving items in a selected direction.

For the purposes of promoting an understanding of the principles of the invention, reference will now be made to the embodiment illustrated in the drawings and specific language will be used to described the same. It will nevertheless be understood that no limitation of the scope of the invention is thereby intended, such alterations and further modifications in the illustrated device, and such further applications for the principles of the invention as illustrated therein being contemplated as would normally occur to one skilled in the art to which the invention relates.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

The information included in this section, data or specifications, including any references cited herein and any description or discussion thereof, is included for exemplary purpose only and is not to be regarded as subject matter by which the scope of the invention as defined in the claims appended hereto is to be bound.

The following text sets forth a broad description of numerous different embodiments of present disclosure. The description is to be constructed as exemplary only and dose not describes every possible embodiment since describing every possible embodiment would be impractical if not impossible. It will be understood that any feature, characteristic, component, composition, ingredient, product, step or methodology described herein can be deleted, combined with or substituted for, in whole or part, any other feature, characteristic, composition, ingredient, product, step or methodology described herein. Numerous alternative embodiments could be implemented, using either current technology or technology developed after the disclosure date of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As shown in FIG. 1 and labeled as prior art, conventional conveyor roller assembly 14 include a plurality of conveyor rollers 12 positioned within a frame whereby each roller can freely rotate about its axis in the absence of an applied braking force. The conveyor can be belt driven and/or include gravity driven conveyor rollers and the rollers can be positioned to provide both forward and lateral motion to articles conveyed thereover.

The present invention as depicted in FIGS. 2-7 provides an inexpensive modular conveyor roller replacement assembly including a modular conveyor glide plate assembly 10 providing a removable and insertable spacer which can be substituted for conveyor rollers 12 in a roller conveyor assembly 14, (preferably replacing alternate rollers), to maintain a substantially solid surface when supporting a lighter load. The modular conveyor roller glide plate assembly 10 mounts to an existing conveyor roller frame for easy attachment and removal and bridges the gap between alternating conveyor rollers 12 replacing selected alternating rollers 12 and providing a substantially solid surface for conveyance of articles there over.

Conventional powered skewed conveyor rollers 12 are supported by left and right longitudinal frame members 16. A plurality of conveyor angle brackets 18 are attached to the inner wall 20 of each longitudinal frame member 16 in spaced apart alignment with opposing angle brackets 18 affixed to the opposing frame member 16. The angle brackets 18 may be mounted flat adjacent the surface of the wall 20 of the frame member 16, or juxtaposed whereby a portion of the angle bracket 18 extends at a selected angle defining a tab 22 having a aperture 24 therein for holding a bolt 26 or hinge pin to cooperatively engage a holding means such as a nut 28 securing a support clip 90 on the distal end of a conveyor roller 12 thereto.

The glide plate assembly 10 comprises or consists of a longitudinal lateral cross member 30 which extends a selected length between the left and right longitudinal frame members 16. The lateral cross member is formed typically by extrusion and comprises a generally "U-shaped" cross sectional area having a bottom base 36 with opposing side walls 33, 35 extending upward and having an open top. The upper edges 59 of the upper portion of the side walls 33, 35 curve inward forming a flange or lip 60 extending inwardly and downward along the edge of the lateral cross member 30. More particularly, the curved inwardly extending lips 60 can terminate at selected intervals along the length of the lateral cross member 30 and still provide a holding means for securing a glide plate 34 covering the lateral cross member 30 and cooperatively engaging a support clip 90 removably attaching to each end for attaching the lateral cross member 30 to the conveyor frame brackets 18.

As shown in FIGS. 1-7, the lateral cross member 30 comprises a U-shaped cross-section defining side walls 33, 35 extending upward from an integrally formed flat bottom base 36 with upper curved side wall edges 59 defining spaced apart parallel side flanges or lips 60. It is contemplated that the cross-sectional shape of the lateral cross member can comprise a rectangular, semicircular, hexagonal, solid bar, or other shape so long as the upper portion includes means for cooperatively engaging the glide plate 34 such as the lip 60 extending from opposing sides of a lateral cross member 30.

Figure 2:
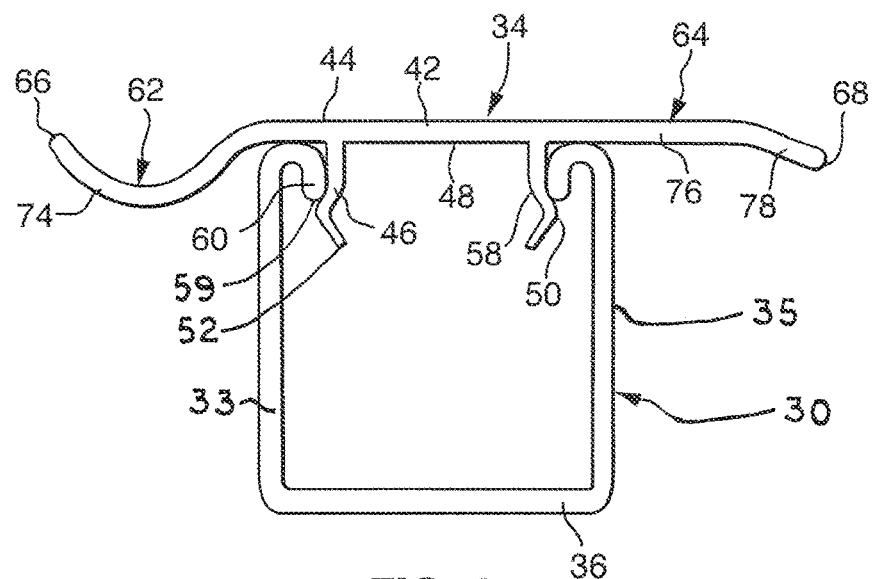
FIG. 2 is an end view showing a glide plate with the forward portion of the tab or flap including a concave curve forming a up-turned lip and the terminal leading edge rising to a position equal distance and in alignment with the top surface of the main body, and a rear flap extending form the main body having a terminal end portion angled slightly downward below the top surface of the main body, wherein spaced apart opposing flanges or prongs extending from a lower surface of the glide plate main body and includes shoulders for cooperative engagement with inwardly projecting distal edges defining flanges extending from the inner surface of the lateral cross member side walls.
Figure 3:
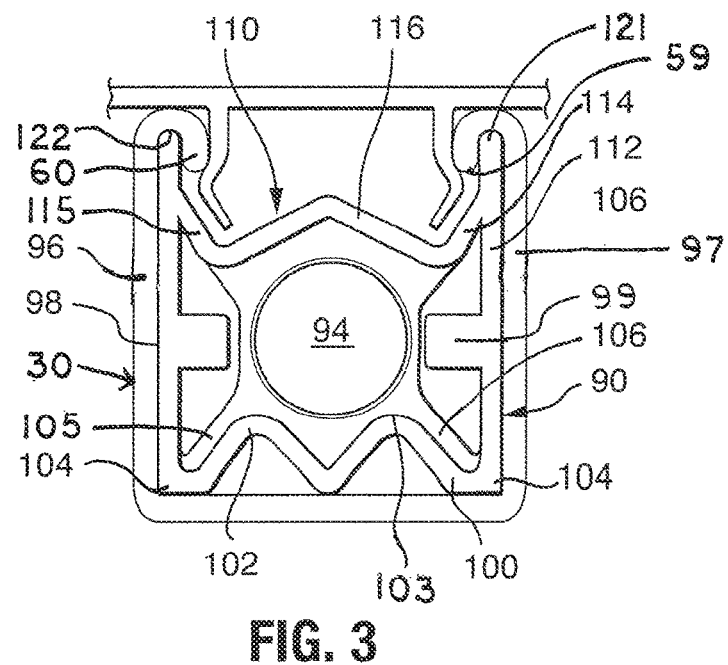
FIG. 3 is an end view of the glide plate assembly shown in FIG. 2 showing an attachment support clip inserted within the distal end of the lateral cross member having a central aperture for removably connecting same by a bolt to the conveyor frame roller bracket with the glide plate main body supported by the prongs cooperatively engaging the inwardly curved flanges of the side walls of the lateral cross member.
Figure 4:
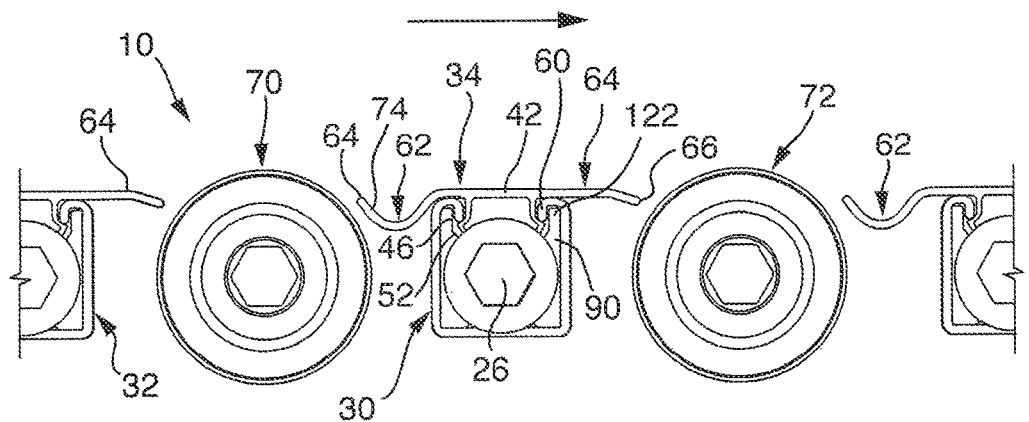
FIG. 4 is an end view of a portion of the conveyor showing the conveyor roller and glide plate assembly with the a bolt and washer holding the support clip within the lateral cross member to the attachment bracket supporting the lateral cross member supporting the glide plate between a pair of conveyor rollers, and showing the trailing edge of rear distal portion of the glide plate flap spaced apart from and angled downward slightly below the top surface of a following roller, and showing the leading edge of the front distal end portion of a following adjacent glide plate positioned slightly below the top surface of the prior roller with the front portion of the guide plate forming a downward curved portion extending to the main body of the glide plate.
Figure 5:
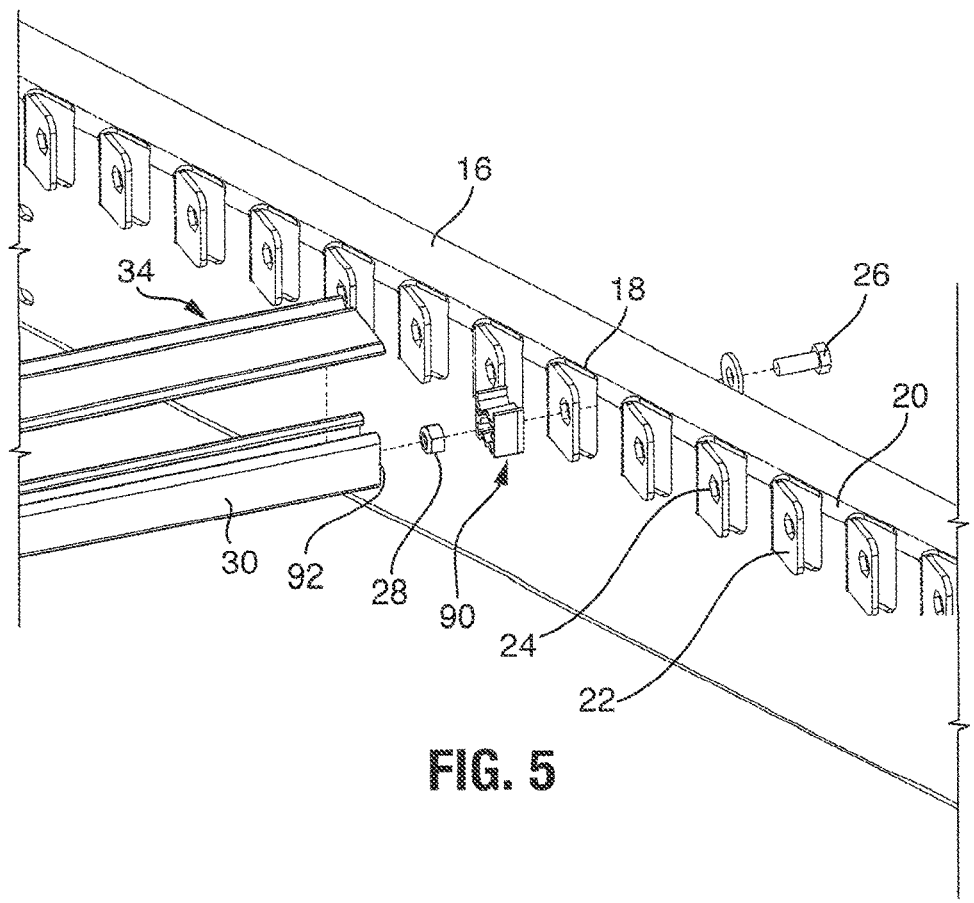
FIG. 5 is an isometric exploded view showing a single glide plate assembly installation with the attachment of the glide plate clip support to a conveyor roller bracket and insertion of the guide plate clip support within the distal end of the supporting lateral cross member supporting the glide plate.

As shown best in FIGS. 2-4 the glide plate 34 comprises or consists of at least one molded, extruded, or printed unitary strip of material formed from a polymer which is flexible and resilient. The glide plate 34 may be a hard plastic, soft plastic, rubber or fabric coated material, a copolymer having a surface of a particular texture, hardness, friction coefficient, or material such as aluminum or stainless steel, chrome steel or combinations thereof. The exterior surface of the glide plate may be a selected to provide a friction altering material to enhance or reduce friction such as polyurethane coating, paint coating, or metallic coating, ceramic material, silicone, TEFLON, or tape. Moreover, the insert surface or tread design may be solid or include pores, cross-hatching, irregularities, dimples, webbing or apertures there through or molded into a top surface thereof. The glide plate surface may include portions which are reinforced, thicker, or composed of a selected material to provide a desired amount of flexibility of spring to the front flap and/or rear flap of the inserted support member or support member strip.

The glide plate 34 includes a substantially rigid medial main body portion 42 which includes an upper surface 44 spanning between the outer surfaces of adjacent conveyor rollers with a length along the longitudinal axis greater than the gap between the adjacent conveyor rollers to substantially close the gap between the alternating conveyor rollers.

The spaced apart opposing legs or prongs 46 extending perpendicular from a lower surface 48 of the glide plate 34 main body 42 include outwardly an extending shoulder 50 for cooperative engagement with the inwardly projecting distal edges defining lips 60 of the lateral cross member side walls. 33, 35. The shoulder is formed on the outer surface of the prong 46 at a selected position spaced a selected distance from the lower surface. The shoulders 50 may comprise an outwardly angled portion 52 or a thicker region of the prong 46. The prongs 46 cooperatively engage the inwardly turned edge or lip 60 along the top inner edge of the lateral cross member 30. The prongs 46 can be comprised of a flexible resilient material with sufficient elasticity and memory to snap or lock into a friction fit position cooperatively engaging the lip 60 or the glide plate 34 may be flexible enough to permit sufficient flexing at the center portion to enable the prongs 46 to be flexed and locked into position cooperatively engaging the lips 60 of the lateral cross member 30.

The glide plate 34 comprises a substantially rigid body with an upper surface 42 spanning between the outer surfaces of adjacent load conveyor rollers and has a length along the longitudinal axis of the conveyor that is slightly less than the gap between the adjacent conveyor rollers to substantially close the gap between the adjacent conveyor rollers. The glide plate 34 includes a front tab or flap 62 and rear projecting tab or flap 64 which extend to the adjacent conveyor rollers generally aligning the upper surface of the glide plate with the upper surface of the adjacent load rollers or slightly below the upper surface of the adjacent rollers. The terminal front end 66 of the front tab and terminal rear end 68 of the rear tab are formed to be positioned at a selected level with respect to the adjacent conveyor in accordance with the type of material to be conveyed whether it be aggregate material in bags, boxes and parcels, or consumer goods or merchandise.

FIGS. 2-4 show the front tab 62 of the glide plate member 34 is formed having a curved portion 74 extending below the upper surface of the glide plate member 34 main body 42 and having a front tab terminal front end 66 extending upward to a selected position whereby the terminal front end 66 is spaced slightly apart from the outer surface of the adjacent conveyor roller 70 providing a spring and flexing capability for the transfer of packages or parcels there over. The rear tab 64 has a horizontal or straight proximate portion 76 extending from the medial body portion 42 of the glide plate member 34 and a rear distal portion 78 which is angled downward slightly so that the terminal rear end 68 is positioned below the upper surface 44 of the glide plate main body 42 in order to flex as packages are transported there over to the adjacent conveyor roller 72. The terminal rear end 68 of tab 64 is spaced apart from the outer edge of the adjacent conveyor roller 72. As shown in the figures, the glide plate member 34 is disposed at a selected level slightly below the top surface of the adjacent front and rear conveyor rollers 70 and 72 respectively. As best illustrated in FIG. 4, the upper surface 44 glide plate 34 including the main body 42, front tab 62, and rear tab 64 are positioned below the top surface of the adjacent conveyor rollers 70, 72.

The front tab 62 and rear tab 64 extending from the main body 42 which are straight or angle upward or downward depending upon the required flexibility of the glide plate main body member 34; however, the front tab 62 could be angled instead of curved to provide the requisite flexibility and support and be of a longer or shorter length depending upon the requirement determined by the types of articles conveyed there over.

The glide plate member 34 and lateral cross member 30 shown in FIG. 3 include the support clip 90 removably disposed within the distal end 92 of the lateral cross member 30. The bracket 90 has a central aperture 94 for removably connecting same by a bolt 26 and washer 27 to the angle bracket 18 of the conveyor frame 16. The support clip 90 is molded from a polymer, or cast or stamped from metal. The support clip 90 includes a pair of spaced apart straight side walls 96 and 97 extending to a base plate 100 having a pair of support ridges 102 and 103 which extend to the bottom corner 104 of the side walls 96 and 97 defining legs. A pair of medial reinforcement tabs 98 and 99 protrude inwardly from the side walls 96 and 97. The top 110 of the support clip 90 extends from an inner surface 112 of the opposing side walls 96 and 97 downward toward the center aperture 94 and upward over the center aperture to a selected point 116 forming opposing reinforcement arms 114 and 115. The portion of the support clip 90 between the central aperture 90, the arms 114, 115, and the legs 105, 106 comprises a solid web of material defining a wall 120 including the aperture 94 for holding a bolt 26 which removably secures the wall 120 and support clip to the bracket 18 of the conveyor frame member 16. The portion of the side walls 96 and 97 extending above the reinforcement arms 114 and 115 define a pair of opposing flanges 121 and 122 which cooperatively engage the inwardly and downwardly curved edges forming the lips 60 of the lateral cross member 30 for slidable engagement therewith.

Figure 6:
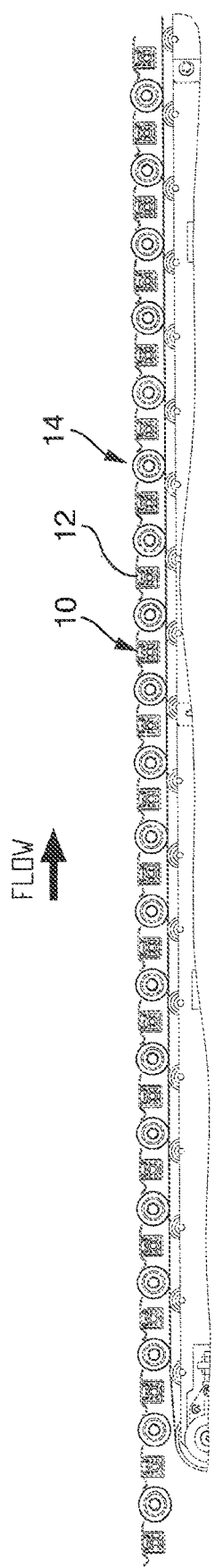
FIG. 6 is an end view showing a conveyor utilizing multiple glide plate assembly modules disposed between conventional conveyor rollers.
Figure 7:
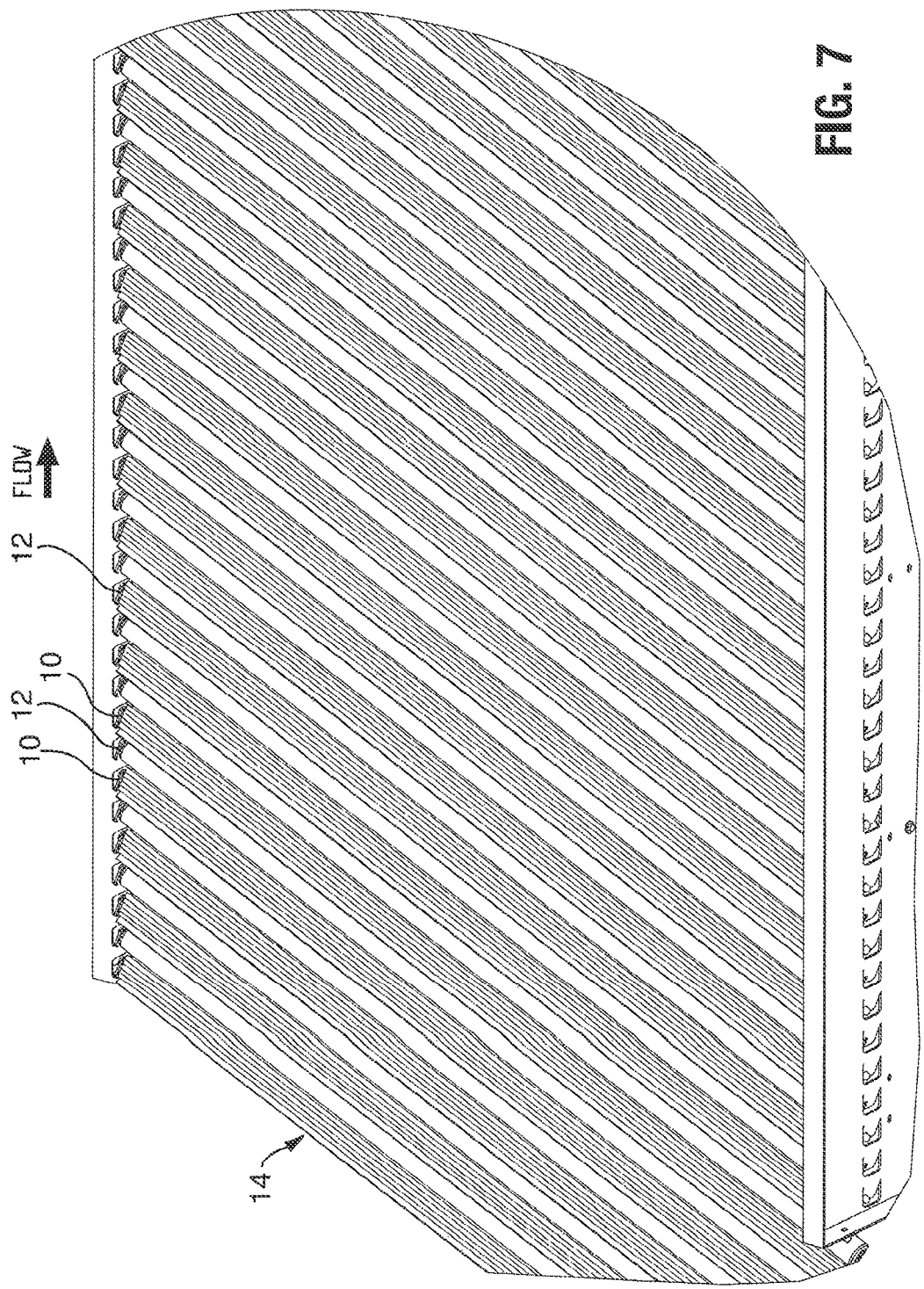
FIG. 7 is a perspective view of the conveyor shown in FIG. 6 using multiple glide assembly plate modules disposed between conveyor rollers providing a substantially solid surface.
Figure 8:
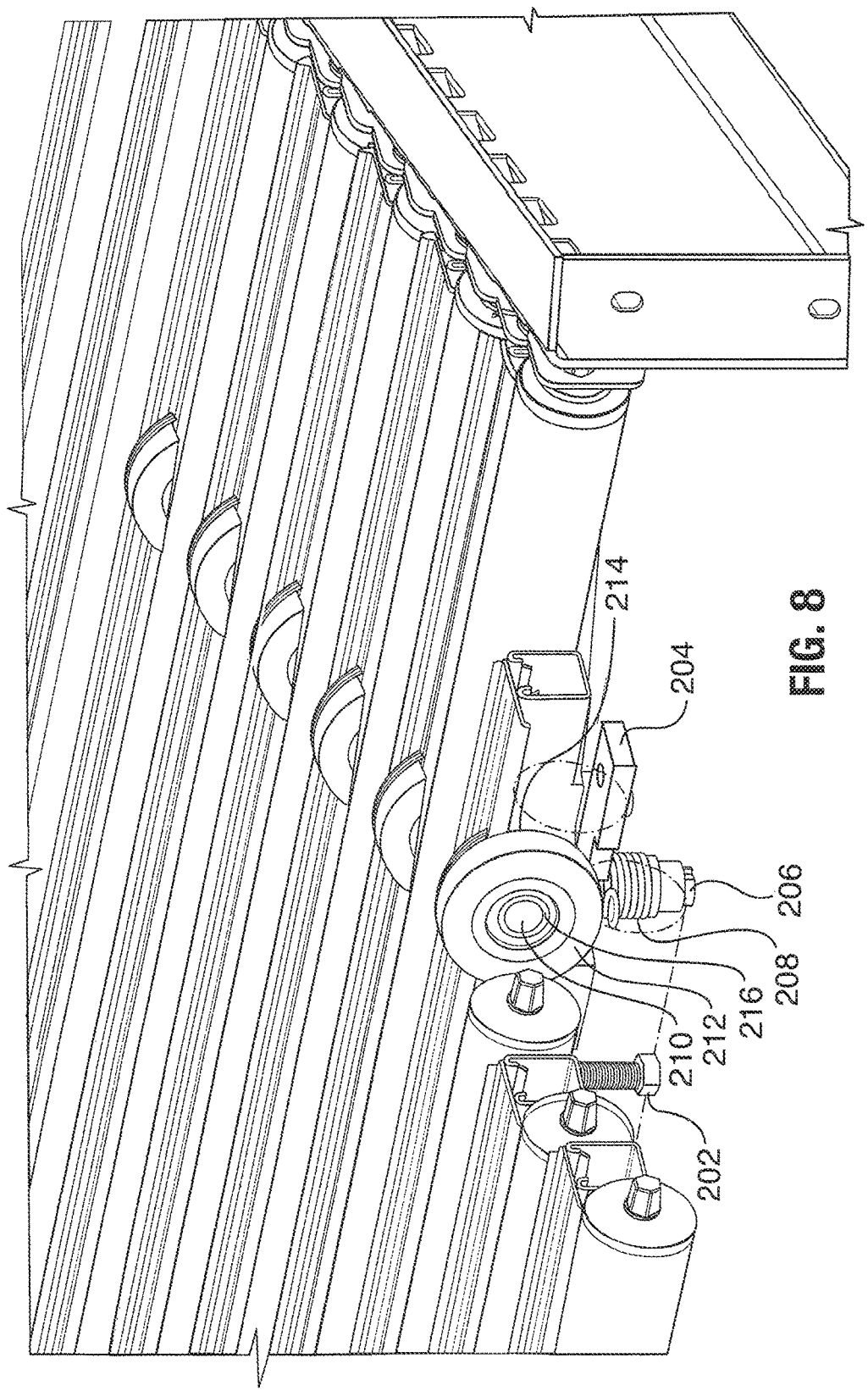
FIG. 8 is a cutaway isometric view of conventional conveyor rollers supported by left and right longitudinal frame members showing the glide plate assembly with a longitudinal lateral cross member extending a selected length between the left and right longitudinal frame members and a plurality of diverter wheel assemblies mounted thereon.

As shown in FIGS. 6 and 7, a conveyor having conventional rollers can substitute the instant glide plate modules for the conventional conveyor rollers in an alternating manner to provide a substantially solid surface while reducing the number of rollers necessary for transport of the goods there over.

Diverter Wheel Assembly

FIGS. 8-22 show powered skewed conveyor rollers 12 supported by left and right longitudinal frame members 16 showing the glide plate assembly 10 with a longitudinal lateral cross member 30 extending a selected length between the left and right longitudinal frame members 16. A bolt 202 holds an attachment plate 204 to the bottom of the cross member 30.

Figure 9:
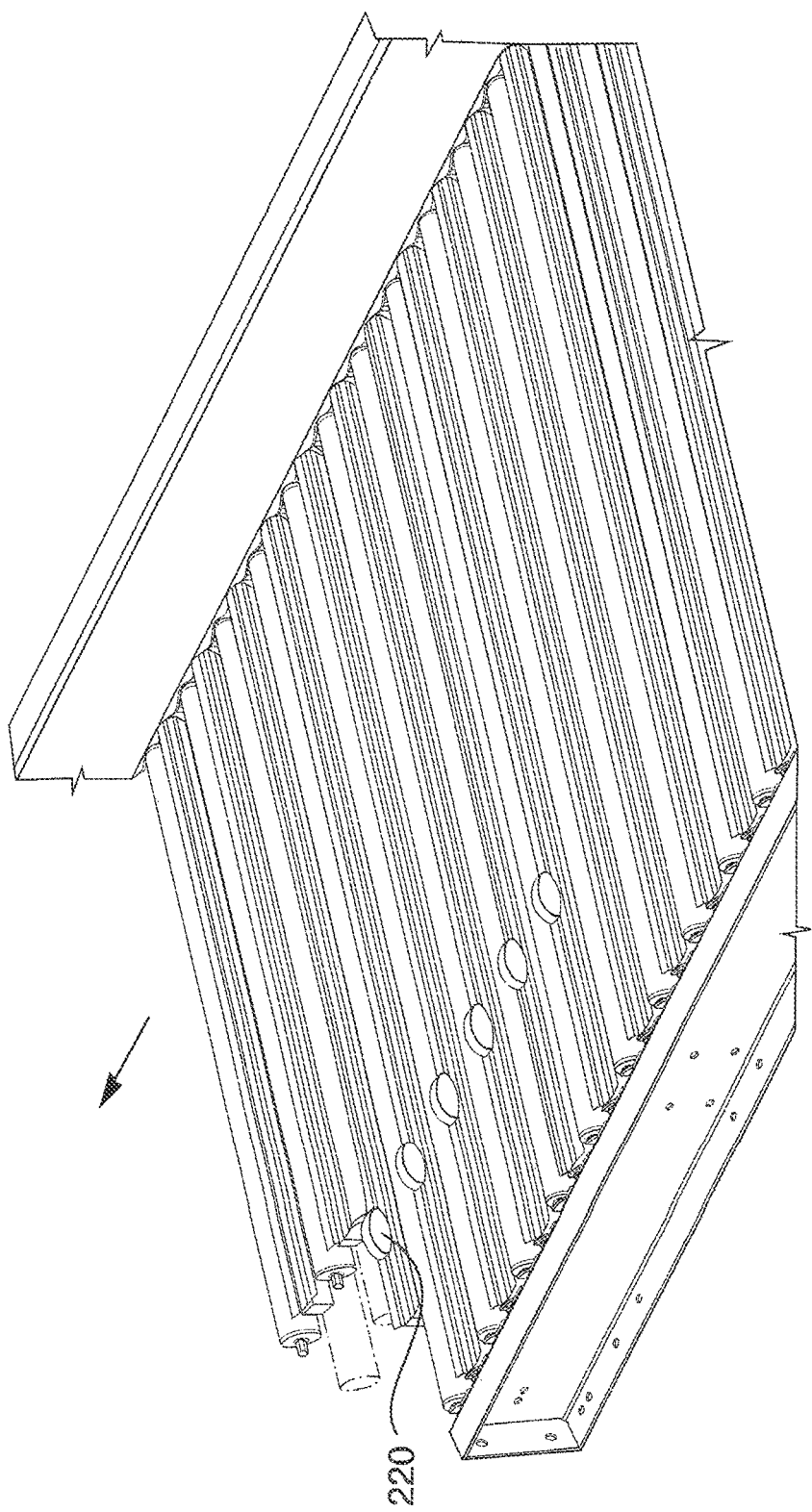
FIG. 9 is an isometric view showing a wheel assembly with the diverter wheels and deflectors extend above the conveyor rollers in spaced apart alignment at selected positions mounted between conveyor rollers in openings formed in the glide plate.
Figure 10:
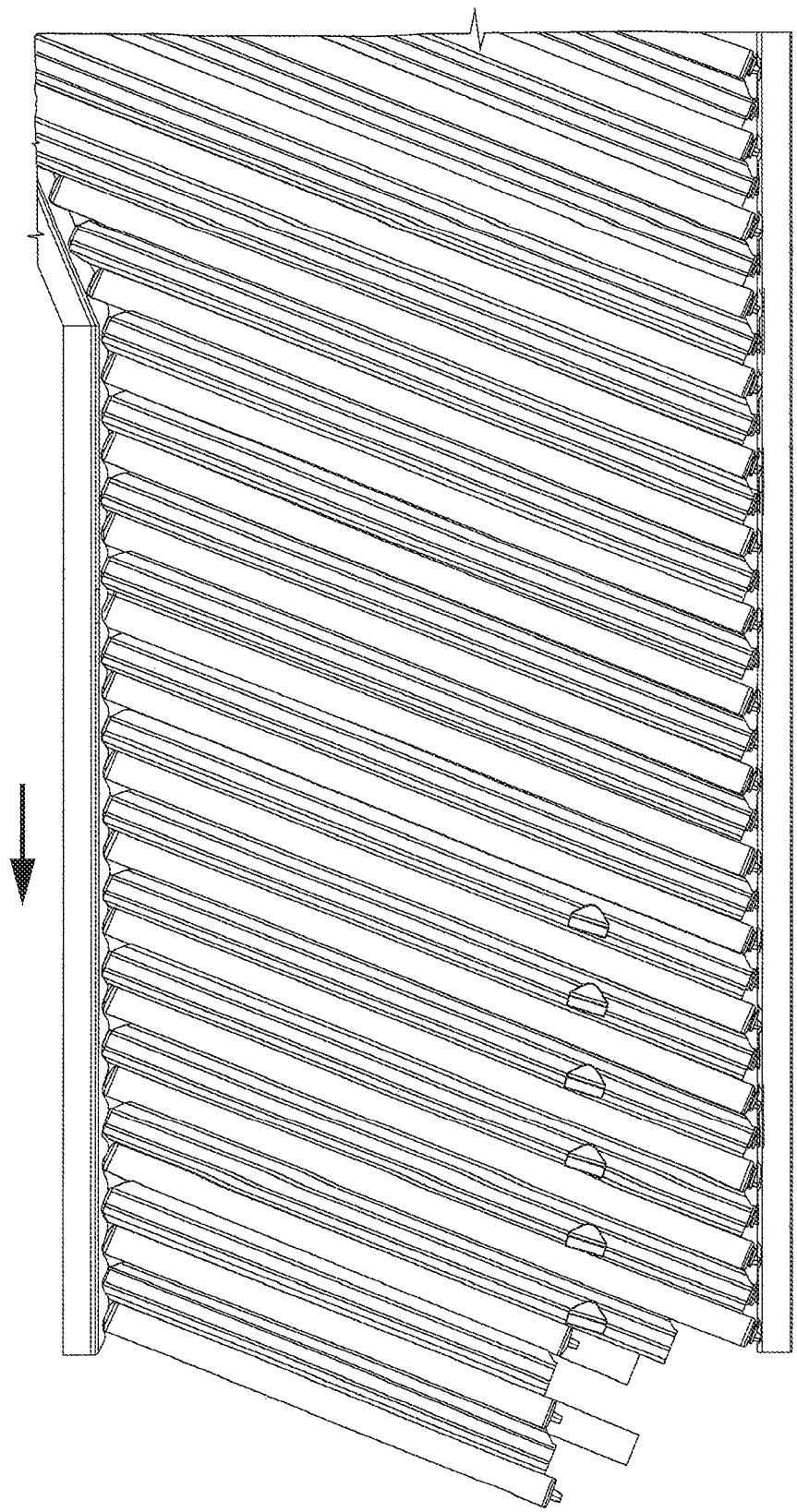
FIG. 10 is a top view of FIG. 9 showing the conveyor rollers and diverter wheel assembly diverter wheels and deflectors.
Figure 11:
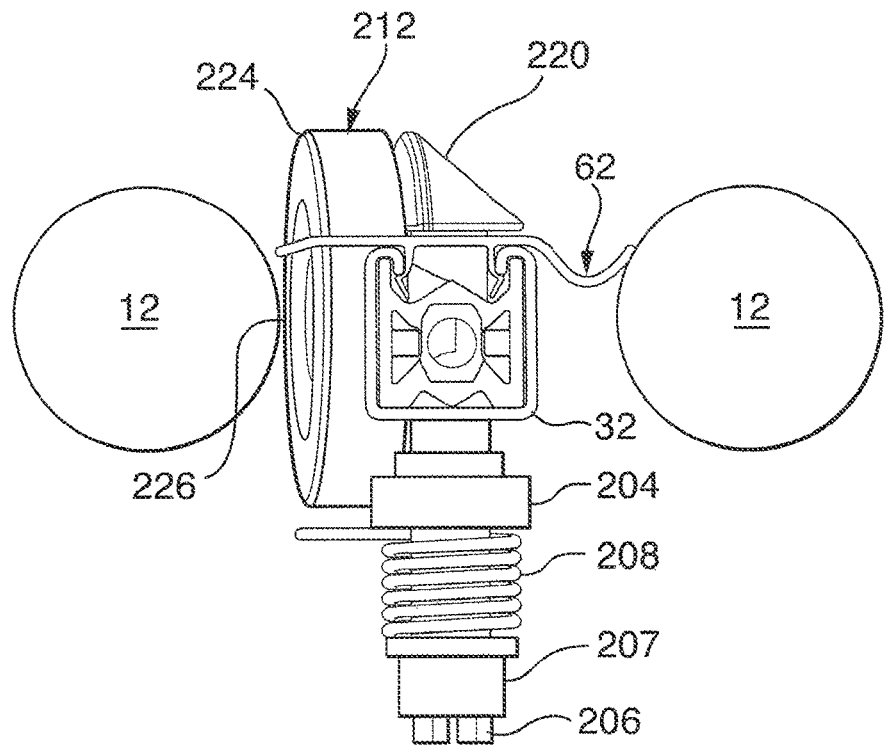
FIG. 11 is a sectional view normal to the axis of the diverter roll wheels and lateral frame member showing the transverse axle, tension spring, and deflector positioned in a gap between conveyor rollers.
Figure 12:
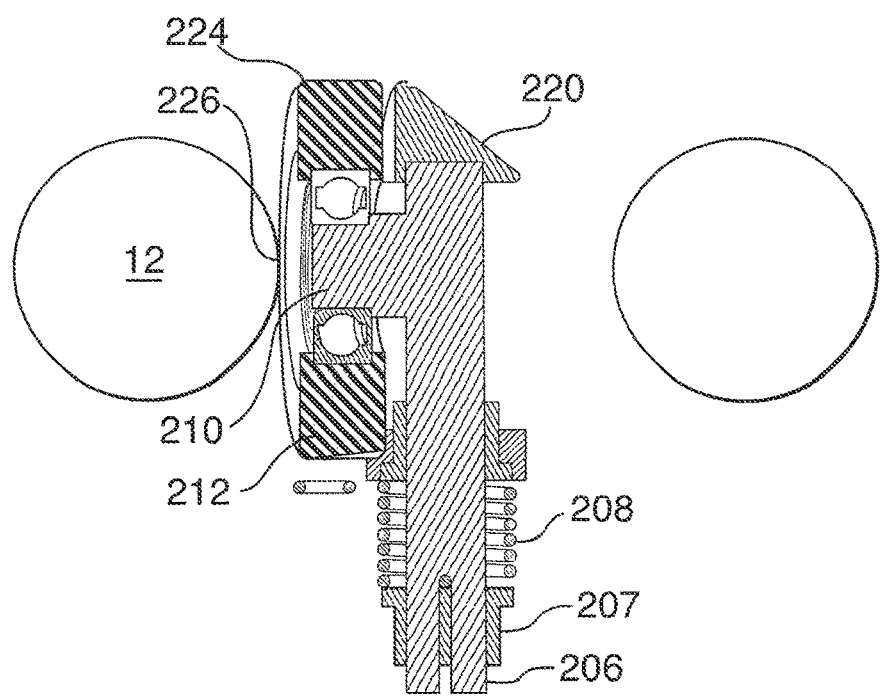
FIG. 12 is a sectional view of the embodiment shown in FIG. 11 showing a diverter wheel assembly mounted in alignment with a longitudinal lateral frame member showing the transverse axle, tension spring, and deflector positioned in a gap between conveyor rollers.
Figure 13:
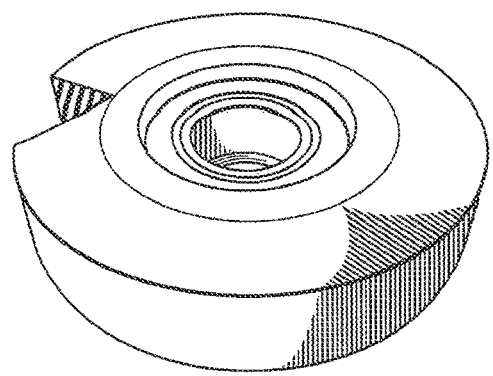
FIG. 13 is a perspective view of a diverter wheel having an elastomer or rubber material mounted on a hub having a bearing for rotating on a transverse axle.
Figure 14:
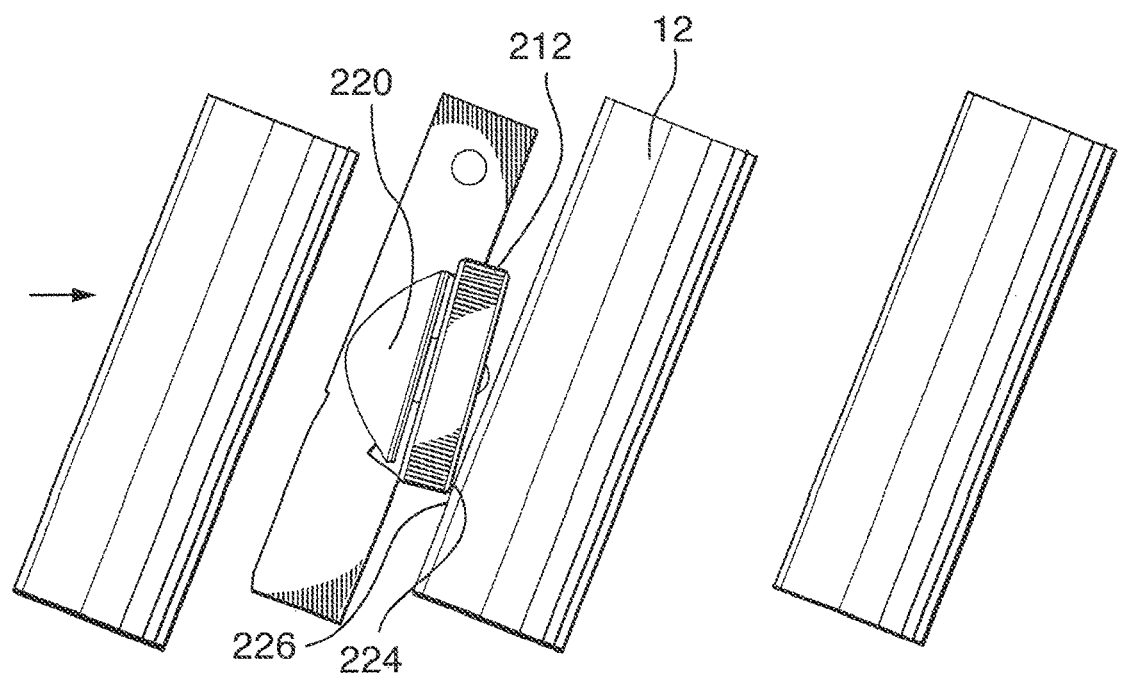
FIG. 14 is a top view of the diverter wheel mounted to the transverse axle supported by the mounting plate with the deflector opposite the diverter wheel.
Figure 15:
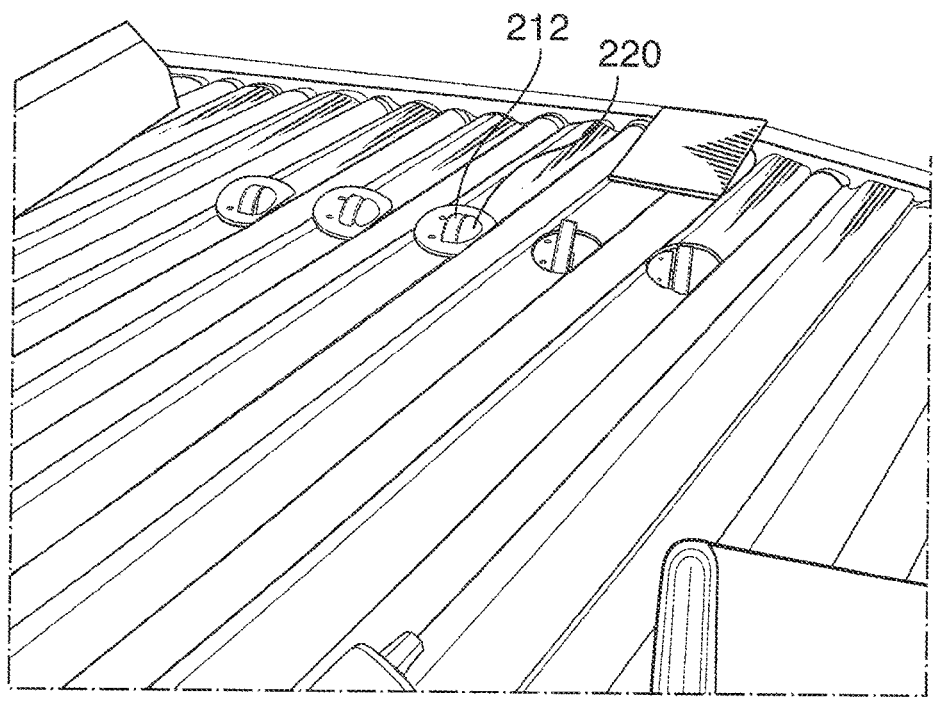
FIG. 15 is an isometric top view of conveyor rollers having glide plates therebetween and a plurality of diverter wheel assembly mounted in a row between adjacent conveyors, with some having deflector plates removed to show the diverter wheels and glide plates mounted between the conveyor rollers.
Figure 16:
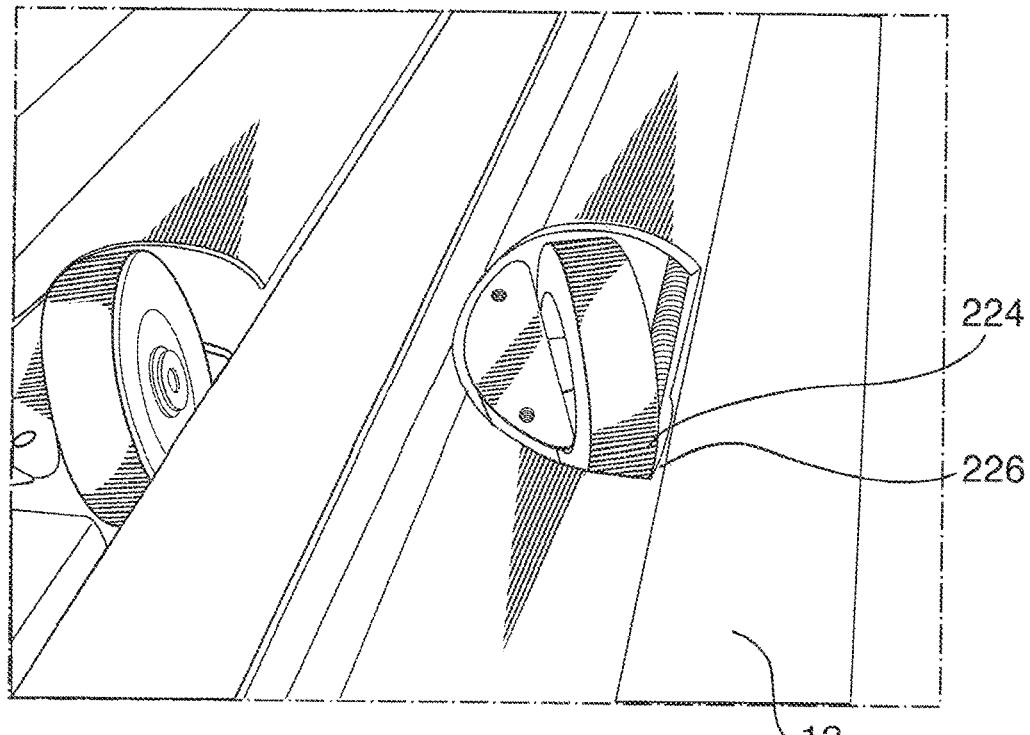
FIG. 16 is an enlargement of FIG. 15, showing the edge of a diverter wheel contacting the driven skewed roller of the conveyor.
Figure 17:
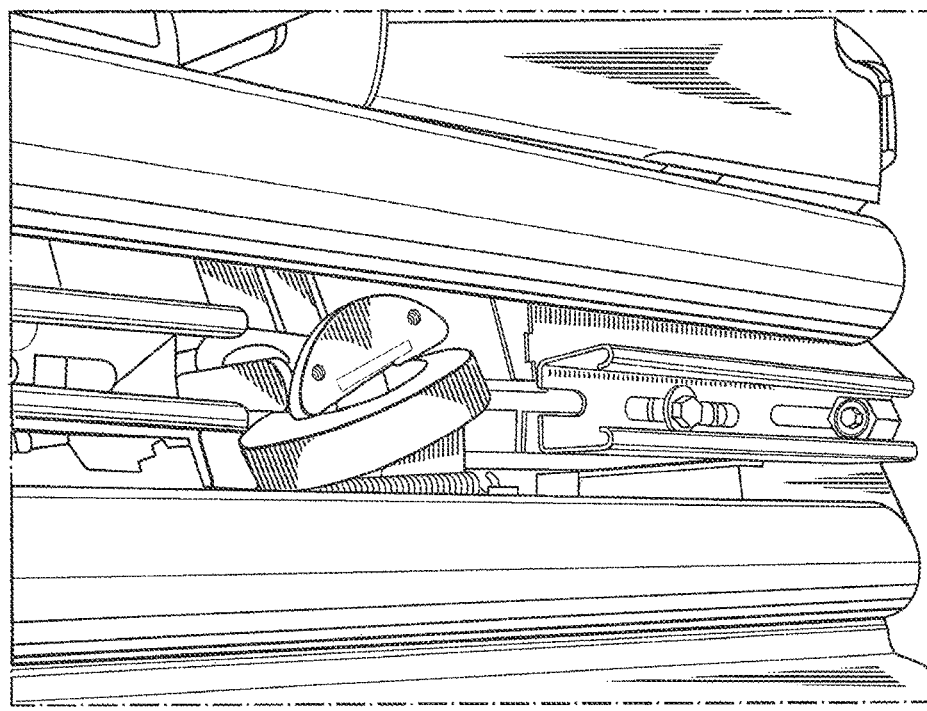
FIG. 17 is a top view of a diverter wheel assembly mounted in an opening formed in the longitudinal lateral cross member and glide plate between a pair of conveyor rollers.
Figure 18:
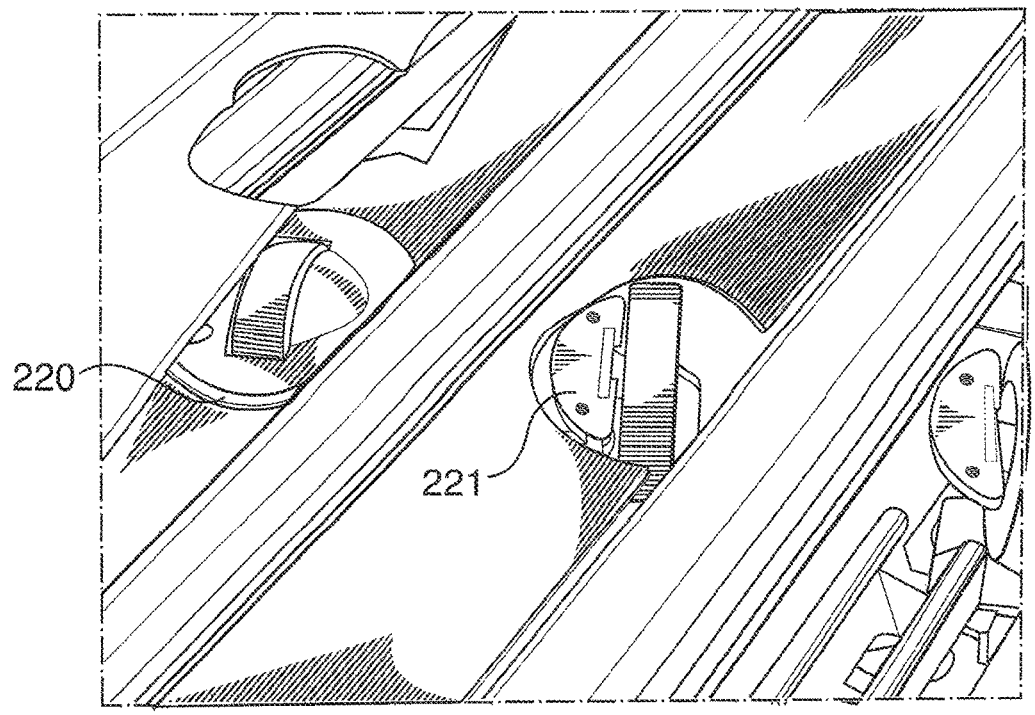
FIG. 18 is a top view of a diverter wheel assembly mounted in an opening formed in the longitudinal lateral cross member covered by a glide plate mounted between a pair of conveyor rollers.
Figure 19:
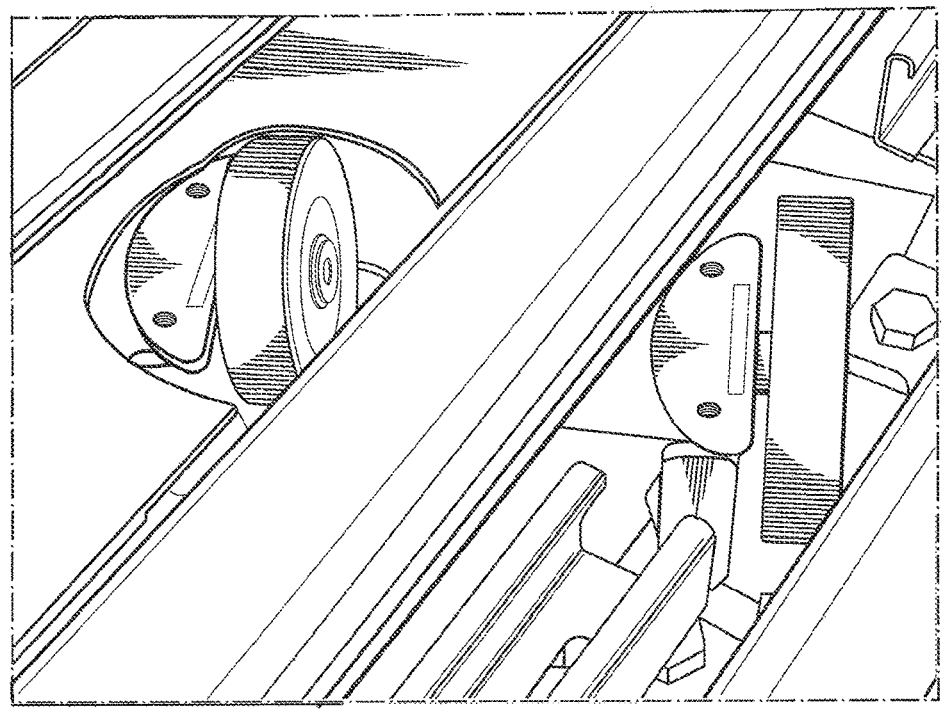
FIG. 19 shows the diverter wheel and deflector base of FIG. 16 with the glide plate removed to show alignment with the longitudinal lateral cross member.
Figure 20:
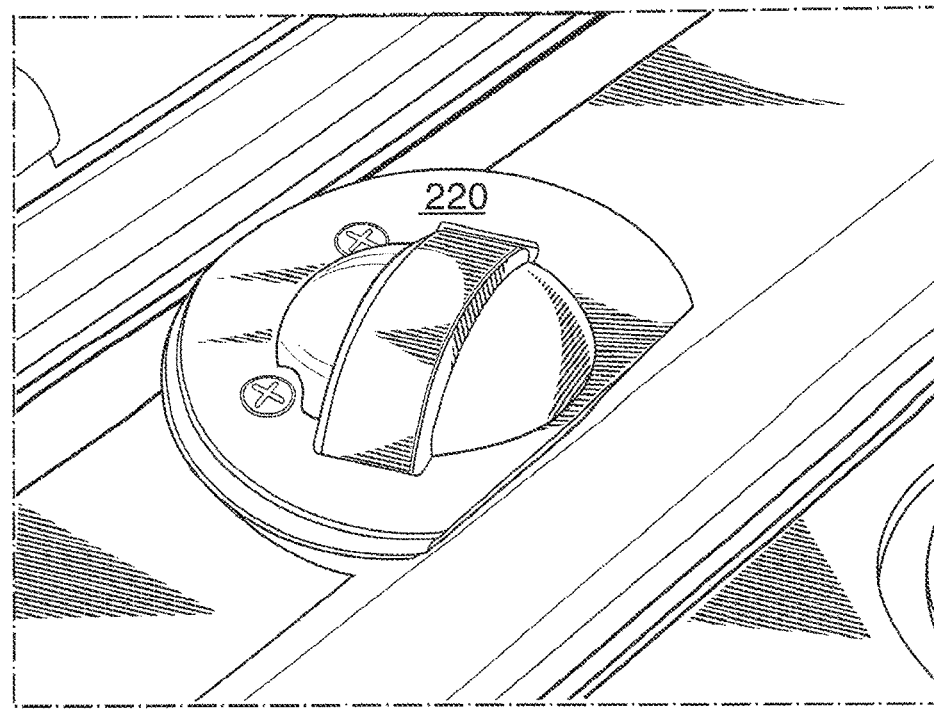
FIG. 20 is an enlarged view of a deflector and diverter wheel between adjacent conveyor rollers.
Figure 21:
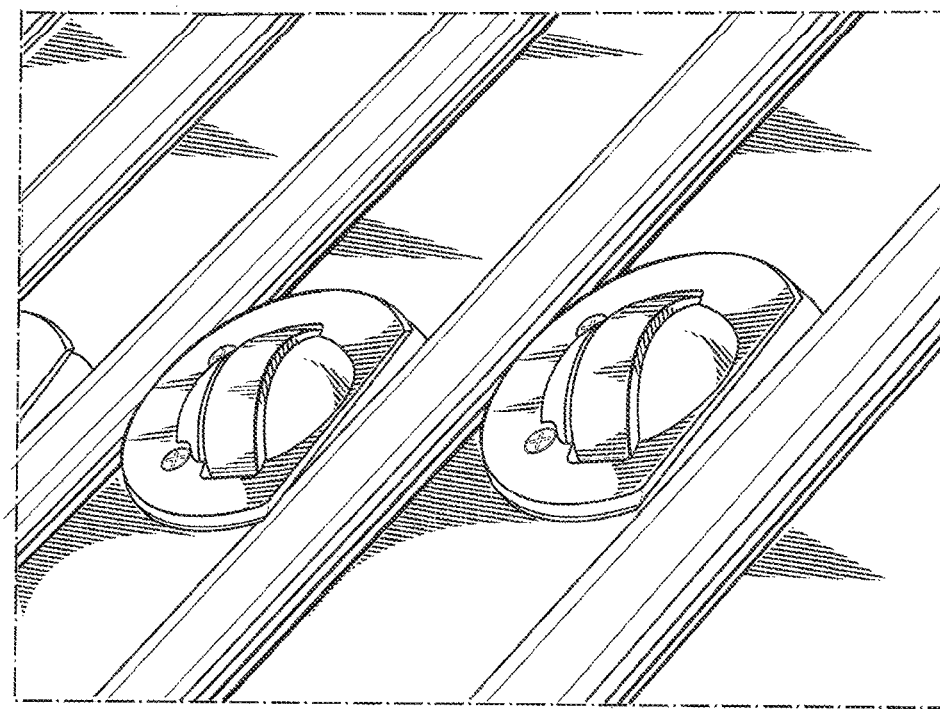
FIG. 21 shows a row of deflector and diverter wheels.
Figure 22:
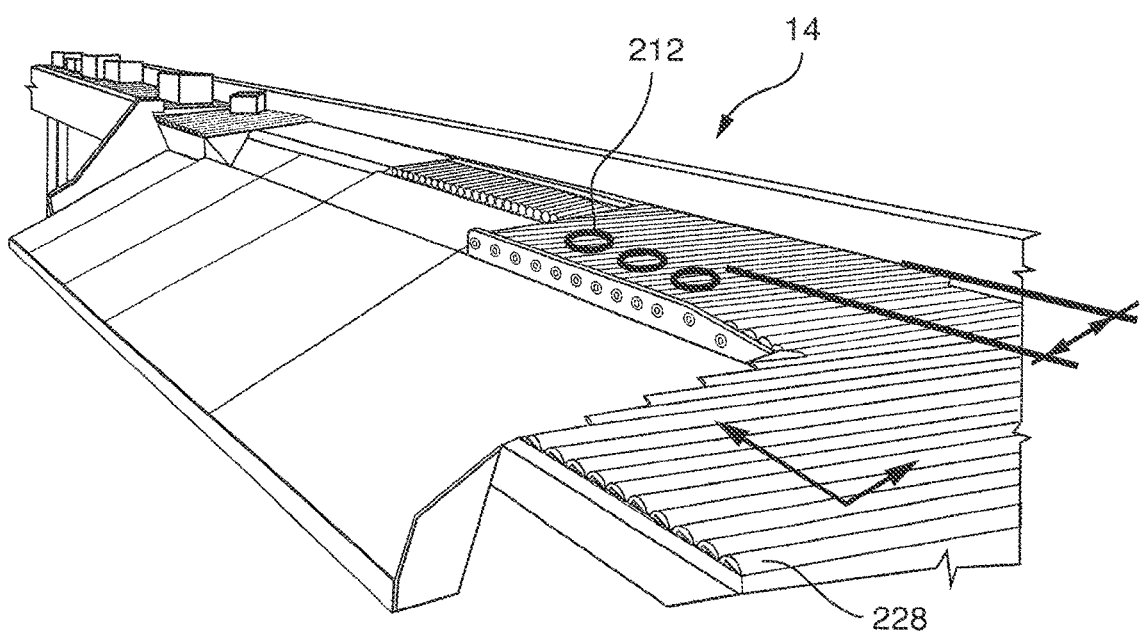
FIG. 22 is a perspective view showing a plurality of diverter wheels disposed in a skewed roller conveyor having a forward and lateral component of conveyance to position items along a side wall wherein the diverter wheels are aligned in a row spaced apart a selected distance from the vertical wall forming a maximum item width threshold whereby items contacting the diverter wheels will either be aligned or removed to prevent jamming of the skewed conveyor.

As shown in FIGS. 9 and 10, a deflector 220 is removably attached to a base plate 222 shown in FIGS. 16-19 mounted to the side of the transverse axle 210 opposite to the diverter wheel 212. The deflector helps to lift portions of the packages up and off of the conveyor rollers reducing friction and facilitating lateral movement of the package coming in contact with the high friction surface of the diverter wheels 212.

The diverter wheel spindle assembly 210 includes a spindle shaft 206 removably affixed to the plate 204 and held in position by a bushing 207 or other holding member and is affixed to the cross member 30 disposed in a gap between adjacent conveyor rollers. A tension spring 208 is axially mounted onto the spindle shaft 206 below the plate and a transverse axle 210 extends from the top portion of the spindle shaft 206 for removably mounting a diverter wheel 212. It is contemplated that other spring means or actuators or rubber mounts or other means of biasing the edge of the diverter wheel against a powered conveyor roller may be used in the instant invention.

The conveyor diverter wheel assembly of extends above said conveying surface a distance of up to one inch and more preferably about one half inch. The conveyor diverter wheel assembly is disposed at an angle of up to 90 degrees, more preferably at an angle of from 30 to 60 degrees, and more preferably at an angle of about to 45 degrees.

The outer wheel surface contacting the conveyor roller of a wheel using a rim or of a wheel formed from a single compound or material comprises a high friction surface and may composed of a solid rubber, elastomer, or polymer or composite material, or plastic or metal wheel coated with a high friction material or a rubber, a polymer, or composite material disposed on a rotating hub 216 rotating and connecting to the transverse axle 210. The conveyor diverter wheel is selected from the group of high friction imparting materials consisting of a solid rubber, an elastomer, or a polymer, a composite material, a polyblend compound comprising plastic and rubber, a vinyl material, a polyethylene material, a meal wheel rim holding a polymeric outer wheel, a solid polymeric wheel, a metal wheel coated with a polymer, and a composite material.

An opening 214 is formed in the frame member 16 and glide plate to provide suitable clearance for the diverter wheel spindle assembly 210. The selected section of the glide plate 34 is removed to provide contact with the packages or articles conveyed thereover. The longitudinal lateral cross member 30 is shown in alignment with the diverter wheel assembly spindle 210 positioned between adjacent conveyor rollers so that the diverter wheel 212 and deflector 220 have a portion extending above the conveyor rollers for contacting packages. A corner edge 224 of the diverter wheel 212 makes frictional contact with the surface 226 of the powered conveyor roller 12 biasing and rotating the diverter wheel 212.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

I claim:

1. A conveyor diverter wheel jam prevention assembly, comprising:
   a roller conveyor comprising a plurality of powered skewed rollers mounted at an angle with respect to a longitudinal axis of said roller conveyor moving items in a forward and lateral direction;
   a vertical sidewall extending along a lateral edge of said roller conveyor;
   a frame for supporting said conveyor rolls;
   a plurality of diverter wheel assemblies affixed to said frame supporting said conveyor rollers;
   each one of said plurality of diverter wheels is disposed between adjacent spaced apart conveyer rolls;
   each one of said plurality of diverter wheels is in frictional contact with and driven by an adjacent conveyor roll;
   each one of said plurality of diverter wheels all rotate at the same speed;
   means for biasing a surface of said diverter wheel against a surface of said conveyor roll for rotating said diverter wheel whenever said roller conveyor is in operation;
   said plurality of diverter wheels are oriented relative to said roller conveyor longitudinal axis with said diverter wheel axles generally perpendicularly aligned to a path of movement of an article on a conveying surface thereof and having an uppermost portion of each of said diverter wheels positioned extending above said conveying surface of said conveyor rolls;
   said roller conveyor including a glide plate removably attachable to said frame disposed between said spaced apart conveyor rolls, said glide plate including an opening for said uppermost portion of said diverter wheels to extend above the surface of said glide plate and said conveyor rolls;
   said plurality of diverter wheel assemblies spaced apart from said vertical sidewall a selected distance limiting the width of an article passing through between said vertical wall and said diverter wheel;
   said diverter wheels affixed at an effective angle and an effective height whereby said portion of said diverter wheels extending above the conveying surface of said roller conveyor contacting said article conveyed by said roller conveyor pulls said article away from said vertical sidewall diverting said article from said roller conveyor.

2. The conveyor diverter wheel assembly of claim 1, wherein a row of said diverter wheels spaced apart are oriented downstream from one another in a row.

3. The conveyor and diverter wheel assembly of claim 1, wherein said glide plate is attachable to said frame and substituted for a conveyor roll.

4. The conveyor diverter wheel assembly of claim 1 including an adapter mountable to a frame and tension spring biasing an edge of said diverter wheel against an adjacent conveyor roll.

5. The conveyor diverter wheel assembly of claim 1, wherein said diverter wheel assembly and glide plate are substituted for a conventional conveyor roll each one having a conveyor frame attachment bracket removably attachable to a conventional conveyor frame roller attachment bracket.

6. The conveyor diverter wheel assembly of claim 1, wherein said diverter wheel assembly includes a diverter wheel deflector attached to a base plate mounted to a side of a transverse axle supporting said diverter wheel, said diverter wheel deflector lifting a front end portion of said article up and on to said diverter wheel and over said conveyor roller conveying surface reducing friction and facilitating lateral movement of said article coming into contact with a high friction surface of said diverter wheel.

7. The conveyor diverter wheel assembly of claim 1, wherein said plurality of diverter wheels include an outer surface comprising a high friction surface for contacting said conveyor roller.

8. The conveyor diverter wheel assembly of claim 7, wherein said high friction surface is selected from the group of high friction imparting materials consisting of a solid rubber, an elastomer, or a polymer, a composite material, a polyblend compound comprising plastic and rubber, a vinyl material, a polyethylene material, a meal wheel rim holding a polymeric outer wheel, a solid polymeric wheel, a polymer coating, and a composite material.

9. The conveyor diverter wheel assembly of claim 1, wherein said plurality of said diverter wheels extend above said conveying surface a distance of one half inch.

10. The conveyor diverter wheel assembly of claim 1, wherein said at least one diverter wheel is disposed at an angle of from 30 to 90 degrees with respect to said adjacent conveyor roll.

11. The conveyor diverter wheel assembly of claim 1, wherein said at least one diverter wheel is disposed at an angle of about to 45 degrees with respect to said conveyor roll.

12. The diverter wheel assembly of claim 1, wherein said plurality of skewed rollers have a low friction conveying surface for moving items in a forward and lateral direction.

13. The conveyor diverter wheel jam prevention assembly of claim 1, further comprising:
   means for mounting a spindle assembly to a frame of said roller conveyor for supporting said conveyor diverter wheel;
   said spindle assembly including a transverse axle for rotation of a diverter wheel thereon;
   said diverter wheel having a high friction surface mounting on a hub having a bearing for rotating on said transverse axle.

14. The diverter wheel assembly for a roller conveyor of claim 1, wherein said means for biasing said surface of said diverter wheel against a surface of said conveyor roller comprises a tension spring mounting on said spindle assembly.

15. A roller conveyor and diverter wheel jam prevention assembly, comprising:
   a roller conveyor including a plurality of powered skewed rollers having a low friction conveying surface mounting on a frame and conveying articles forward and laterally, said skewed rollers mounted at an angle with respect to a longitudinal axis of said roller conveyor;

said conveyor including a plurality of diverter wheel assemblies mounting in a row on said frame at a selected location of said roller conveyor between adjacent rollers, each one of said diverter wheel assemblies having a diverter wheel preventing an article exceeding a selected width from passing between a selected conveyor side edge and said diverter wheel;

said diverter wheel assembly comprising:
a) a diverter wheel;
b) said diverter wheel disposed on an axle of a spindle and having a high friction surface for engaging said conveyor roll and an article conveyed on said roller conveyor and conveying momentum to said article;
c) drive means for rotating a plurality of said conveyor rolls synchronously and said diverter wheel in cooperative frictional engagement with said conveyor roll, each one of said diverter wheels rotating at the same speed and having the same diameter;
d) a spindle assembly including said spindle for mounting said diverter wheel on said frame;
e) said diverter wheels including a tension spring means mounting on said spindle assembly for biasing a surface of said diverter wheels against a surface of said conveyor roll for rotating said diverter wheels whenever said roller conveyor is in operation;
f) means for mounting said spindle assembly to said roller conveyor frame for supporting said diverter wheel;
g) said plurality of diverter wheels are oriented relative to said roller conveyor longitudinal axis with said diverter wheel axles generally perpendicularly aligned to a path of movement of an article on a conveying surface thereof and having an uppermost portion of each of said diverter wheels positioned extending above said conveying surface of said roller conveyor; and
h) a glide plate substituting for a conveyor roller, said glide plate attaching to said frame, said glider plate including an opening therein for a portion of said diverter wheel to extend therethrough at a height above said conveyor roll whereby said diverter wheels engage said articles.

16. The diverter wheel assembly of claim 15, further comprising a vertical sidewall extending along an edge of said selected conveyor side edge.

* * * * *